United States Patent [19]

De Burgos Garcia et al.

[11] 4,423,329

[45] Dec. 27, 1983

[54] GAMMA RADIATION DETECTOR PROBE WITH A HALOGEN-QUENCHED GEIGER-MÜLLER TUBE, COMPENSATED FOR DEAD TIME

[75] Inventors: Eduardo De Burgos Garcia; A. Javier Goñi Unzue; Juan M. Gutierrez Barranco; Juan A. Pajares Suarez, all of Madrid, Spain

[73] Assignee: Junta de Energia Nuclear, Madrid, Spain

[21] Appl. No.: 207,512

[22] Filed: Nov. 17, 1980

[51] Int. Cl.³ .............................................. G01T 1/18
[52] U.S. Cl. ..................................... 250/374; 250/388
[58] Field of Search ...................... 250/374, 375, 388; 328/128, 129

[56] References Cited

U.S. PATENT DOCUMENTS

| | | | |
|---|---|---|---|
| 3,702,936 | 11/1972 | Erickson | 250/388 |
| 3,814,937 | 6/1974 | Lowes | 250/374 |
| 3,984,650 | 10/1976 | Marshall et al. | 250/374 |
| 4,090,082 | 5/1978 | Marshall et al. | 250/375 |
| 4,117,332 | 9/1978 | Felton et al. | 250/374 |
| 4,292,539 | 9/1981 | Todd | 250/374 |
| 4,311,909 | 1/1982 | Utting et al. | 250/374 |

Primary Examiner—Bruce C. Anderson

[57] ABSTRACT

The present invention relates to a gamma radiation detector probe with Geiger-Müller tube of the type which compensates for pulse losses of the Geiger-Müller tube due to dead time and linearizes its response to the number of pulses per unit of time in relation to the gamma radiation exposure rate, including a converter of the electric current from the Geiger tube into a current-dependent pulse frequency, an element for combining or mixing these pulses with those supplied by the Geiger tube, and logarithmic networks for adjusting the frequency of the converter in order to linearize the response of the complex.

5 Claims, 3 Drawing Figures

GAMMA RADIATION DETECTOR PROBE WITH A HALOGEN-QUENCHED GEIGER-MÜLLER TUBE, COMPENSATED FOR DEAD TIME

BACKGROUND

This invention refers to a kind of gamma radiation detector probe with a halogen quenched Geiger-Müller tube and to a procedure which extends the measuring range of the said tube, compensates for pulse losses due to dead time and avoids the saturation effects of the tube by simultaneously employing the electrical pulses and the current delivered by the Geiger tube when the latter is exposed to a gamma radiation field. Moreover, the procedure includes means of adjusting the response of the probe for a certain value of the exposure rate, regardless of the Geiger tube used, within those of the same type. Also includdedare means which prevent the temperature of the Geiger tube from dropping from a certain adjustable value, with the purpose of lengthening the life of the tube.

It is known that when the exposure rate of the gamma radiation which impinges on a Geiger-Müller (GM) tube is increased, the pulse losses due to dead time of the said tube become more significant, which causes a loss of proportionality between the exposure rate and the number of pulses delivered by the Geiger tube; therefore the use of the tube is limited unless corrections are made, with calculations that are more or less feasible and in all cases troublesome.

It is also known that by increasing the gamma radiation exposure rate to values higher than those that correspond to its measuring range, the electrical pulses which the tube delivers decrease in amplitude to the point of disappearing, due to a reduction of the electric charge per pulse as a result of the increase of the mean current which passes through the tube. This reduction of the amplitude and the disappearance of the pulses may produce dangerous situations and cause accidents due to false indications of the measuring equipment at high exposure rates.

The two preceding phenomena produce, as a result, a dependence of the current from the Geiger tube proportional to the logarithm of the exposure rate, until the constant value of the saturation current is reached.

Procedures have been employed for extending the range of use of the Geiger tubes and linearizing their response in relation to the exposure rate by pulsating the polarization high voltage of the tube or superimposing a voltage pulse upon the latter. This procedure has the disadvantage of having to produce electrical pulses of some hundreds of volts in amplitude.

In this invention simultaneous use is made of the voltage pulses generated by the Geiger tube and of the current which passes through it, with the net result of a linearization of the count rate-exposure rate characteristic of the probe, so that the latter delivers electrical pulses whose frequency has an appreciably linear relation to the exposure rate in the whole measuring range. The said pulse frequency can be measured with any frequency meter or suitable measuring equipment.

The probe has two channels for transmission of the signals which the Geiger tube produces when it is situated in a gamma radiation field.

The first channel is the pulse channel and it transmits a fixed fraction of those which the Geiger tube generates. Geiger tubes of the same type present approximately equal count rates for a given exposure rate, but there is a certain dispersion among them due to differences of sensitivity. In order to correct such a dispersion and to compensate for the sensitivity differences of the Geiger tubes, within those of the same type, the passage of the pulses from the Geiger tube through the pulse channel of the probe is periodically blocked for fixed and adjustable periods of time so that the probe delivers a fixed number of pulses per second for a given value of the exposure rate. The procedure is characterised by the possibility of calibrating and adjusting the probe independently of the measuring equipment.

The second channel of those mentioned is the current channel. It acts when the value of the mean current which passes through the Geiger tube exceeds a certain value. When this occurs, a current-to-pulse frequency conversion takes place, with a characteristic of proportionality between the current of the Geiger tube and the logarithm of the pulse frequency.

The pulses from this channel are mixed, or added in the Boolean sense, in a suitable device, to those from the pulse channel, thus obtaining an approximately linear characteristic between the exposure rate and the pulse frequency at the output of the mixing device.

When the exposure rate has very high values at which the Geiger tube is saturated, and does not produce electric pulses, the current channel continues supplying pules of a frequency greater than that corresponding to the upper limit of the measurement range; in such circumstances the indication of the measurement does not diminish, neither does it reach zero, thus avoiding the possibility of accidents due to false indication at high exposure rates.

Since the probe can be subjected to wide variations of temperature and since, on the other hand, there appears to be a certain degree of evidence that the useful life of a Geiger tube is shortened by rapid drops in temperature, the tube is housed in a suitable thermally insulated enclosure, the temperature of which is prevented from dropping from a pre-adjusted value.

In cases in which the probe may be subjected to severe conditions of impact or vibrations, steps are taken, as another form of non-limitative embodiment, to encapsulate the Geiger tube and the electronic circuit in a silicone elastomer or in another material having suitable physical properties.

The electronic circuit consists of the following parts:
- A halogen quenched Geiger-Müller tube as a gamma radiation detector.
- A gate for the transmission and blocking of the pulses.
- A pulse shaper.
- A current-to-frequency converter.
- An output stage.
- A temperature controller.

Figures 1, 1A:
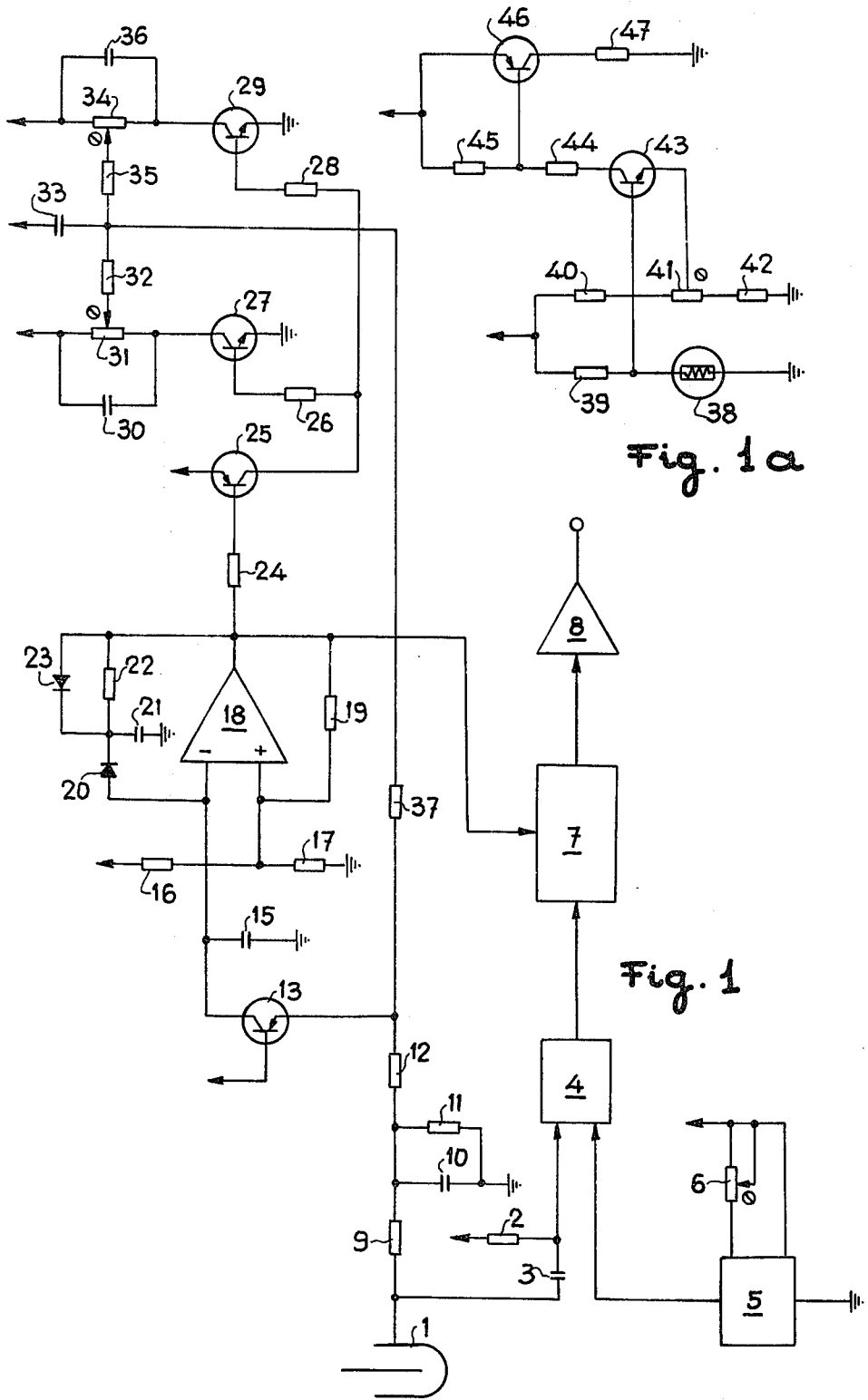
FIGS. 1 and 1a are schematic diagrams of the circuitry used with the GM tube.

The following description is given in relation to FIG. 1, as a non-limitative example, and presents a form of embodiment of this invention:

The pulses produced by the Geiger tube (1) reach the pulse channel through the differentiation network formed by the resistor (2) and the capacitor (3). The said channel is formed by the gate (4) which opens and closes periodically through the action of the square wave generated by the astable multivibrator (5), thus enabling or disabling the passage of the Geiger tube pulses. The potentiometer (6) permits varying the symmetry of the square wave and adjusting the frequency of the pulses which pass for a certain value of the exposure rate, that is to say, it permits adjusting the sensitivity.

The pulses transmitted by the gate (4) trigger the shaper (7) which delivers the pulses with suitable amplitude, width and form. These pulses are applied to the output stage (8) which provides a low output impedance.

The current channel is formed by the current-to-frequency converter. The current supplied by the Geiger tube (1), filtered by the resistor (9) and the capacitor (10), causes the transistor (13) to conduct when that current reaches a certain threshold level, a level dependent on the value of the resistor (11). The transistor (13) when it conducts, charges the capacitor (15) so that the voltage of the capacitor increases until it slightly exceeds the voltage at the non-inverting input of the voltage comparator (18), set by the resistors (16), (17) and (19), at which moment an abrupt change to the low-level state occurs at the output of the comparator (18) which change is accelerated by the positive feedback provided by the resistor (19). With the output of the comparator (18) at the low-level state, the capacitor (21) discharges through the resistor (22), and the capacitor (15) through the diode (20) and the resistor (22), until the change of state to the high level occurs at the output of the comparator (18), starting again the charging of the capacitor (15) and repeating the cycle. In this way there are one microsecond wide negative pulses at the output of the comparator (18), whose frequency is proportional to the collector current of the transistor (13). The recovery of the circuit is accelerated by the action of the diode (23).

The pulses generated by the comparator (18) are applied to the transistor (25) by means of the resistor (24); these pulses cause the transistor (25) to conduct and the transistor (25) causes the transistors (27) and (29) to conduct, through the resistors (26) and (28), with which the capacitors (30) and (36) are charged to the supply voltage at each pulse and are discharged between pulses through the resistors (31), (32) and (34), (35) respectively; it is shown that the sum of the average discharge currents of the capacitors (30) and (36) is approximately proportional to the logarithm of the pulse frequency of the comparator (18). In a steady state a fraction of the preceding sum of currents, filtered by the capacitor (33), is substracted through the resistor (37) from which it proceeds, thorough the resistor (12), of the Geiger tube, with the result that the pulse frequency at the output of the comparator (18) is proportional to the antilogarithm of the Geiger tube current, and consequently, to the exposure rate of the incident radiation. The potentiometers (31) and (34) permit adjustment of the pulse frequency of the comparator (18) for high and low values of the Geiger tube current so that the response of the complex is linear within the range desired.

For applications which require a less accurate compensation, the frequency adjustment networks formed by the transistors (25), (27) and (29) and associated elements are substituted by simpler ones.

The pulses which appear at the output of the comparator (18) are shaped in the shaper (7) and in it they are aggregated to the pulses produced by those of the Geiger tube.

The temperature controller, of the on-off type, prevents the temperature of the Geiger tube (1) being lower than a determined temperature. This, together with the housing of the said tube in a suitable thermally insulated enclosure, reduces the drops in temperature to which the Geiger tube might be subjected. The controller (FIG. 1a) is formed essentially by the transistors (43) and (46), the bridge of resistors which comprises (39), (40), (41) and (42), the thermistor (38) and the heater (47). The thermistor (38) which acts as a temperature sensor and the heater (47) are housed in a metallic block which is used as a support for the Geiger tube, so that the temperature of the latter tube is practically that which the thermistor (38) measures, and the heat generated by the heater (47) is rapidly transmitted to the tube. The temperature at which the device should commence to operate can be set by the potentiometer (41). The resistors (44) and (45) are the load and base resistors of the transistors (43) and (46) respectively.

The temperature controller is eliminated in applications in which the probe is not going to be subjected to very low temperatures.

Figure 2:
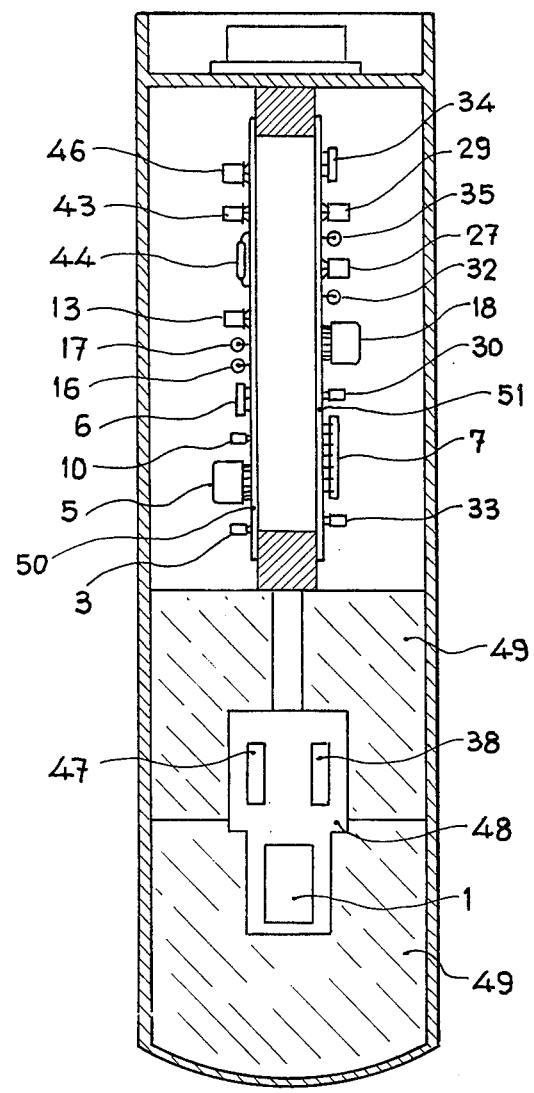
FIG. 2 is a representation of the mechanical arrangement of the probe.

FIG. 2 shows a non-limitative form of embodiment of the probe in which there is seen the metallic block (48) which houses the Geiger tube (1), the thermistor (38) and the heater (47), all of this being surrounded by a suitable thermal insulation (49). In addition, it shows two printed circuit boards (50) and (51) with various of the components they house.

What is claimed is:

1. A Geiger-Müller (GM) tube gamma radiation probe which compensates for pulse losses due to GM tube dead time and linearizes the count-rate versus exposure-rate response of the tube, said probe comprising:
   (a) current-to-frequency converter means for converging the GM tube means current due to radiation into pulses, the frequency of which is dependent on said GM tube current;
   (b) shaping means for shaping the GM tube pulses to radiation incident on the GM tube;
   (c) mixing means for adding or mixing the GM tube pulses with the pulses supplied by said current-to-frequency converter means; and
   (d) logarithmic network feedback means connected to said current-to-frequency converter means, said logarithmic network feedback means including two control means for adjusting the pulse frequency of said current-to-frequency converter means at both low and high exposure rates so that the response of the tube is linearized over its whole measuring range.

2. The gamma radiation detector probe of claim 1 wherein said current-to-frequency converter means is adapted to produce pulses of steadily increasing frequency for increasing values of the exposure-rate so that when the GM tube is saturated, the frequency of said pulses is equal to or higher than that which would correspond to a count-rate versus exposure-rate linearly extended characteristic of the GM tube, whereby said probe avoids false indications due to decreasing count-rates at high exposure-rates.

3. The gamma radiation detector probe in accordance with claim 1, characterized in that the probe sensitivity is calibrated in pulses per unit of time for a given value of the exposure rate, comprising:

(a) gating means for gating the transmission of the GM tube pulses to said shaping means;
(b) time interval source means connected to said gating means for periodically enabling the transmission of GM tube pulses through said gating means so that a fraction of said GM tube pulses is transmitted by said gating means; and
(c) adjusting means for adjusting said fraction so that the probe can be calibrated.

4. A gamma radiation detector probe in accordance with claim 1, further including a temperature controller means for preventing the temperature of the GM tube from dropping below a predetermined, adjustable value whereby the useful life of the GM tube is lengthened in environmental conditions of very low temperature.

5. A gamma radiation detector probe in accordance with claim 1, further including an enclosure for housing said tube; and a temperature sensor means and with heater means disposed in said enclosure in a wrapper of thermal insulating material.

* * * * *